Aug. 9, 1966  H. M. HENDERSON  3,265,338
FLORAL HOLDER FOR CASKETS AND THE LIKE
Filed Sept. 21, 1962
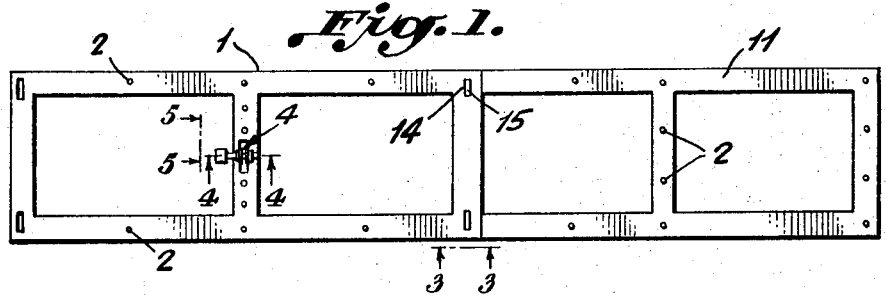
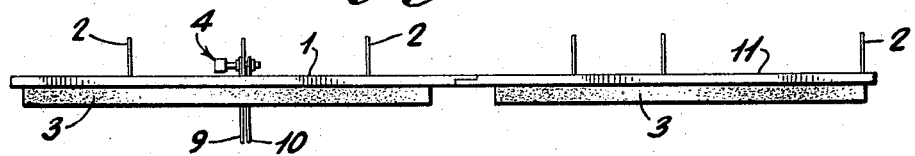
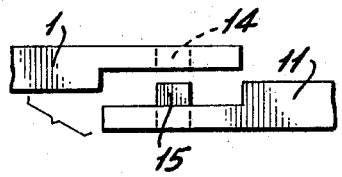
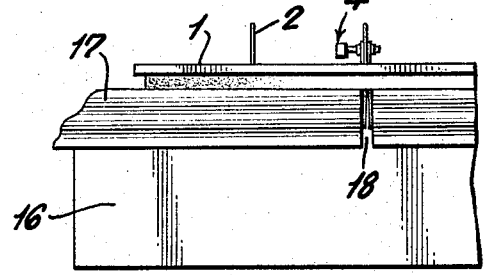
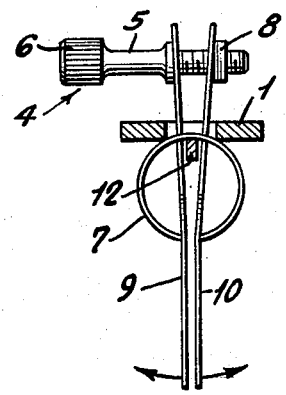
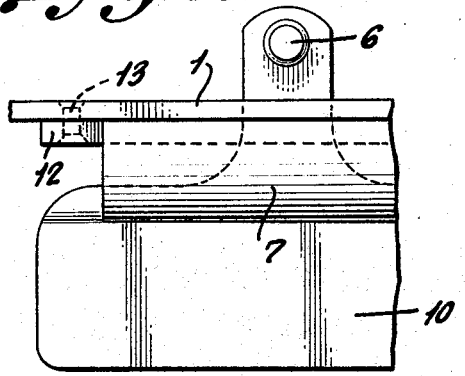
INVENTOR
HARRY M. HENDERSON
BY *Glancock Downing & Seebold*
ATTORNEYS

United States Patent Office 3,265,338
Patented August 9, 1966

3,265,338
FLORAL HOLDER FOR CASKETS AND THE LIKE
Harry Mason Henderson, 256 Princess St., Kingston, Ontario, Canada
Filed Sept. 21, 1962, Ser. No. 225,332
2 Claims. (Cl. 248—27.8)

The present invention relates to a floral holder for caskets and the like and more specifically to a floral holder which can be clamped to the top of a closed casket and is adapted to restrain a floral arrangement placed thereon from moving during tarnsportation of the casket.

During the necessary movement of a casket during a funeral service floral arrangments placed on top of the casket have a tendency to slide or even fall from the casket. The subject invention provides a device to restrain absolutely a floral arrangement placed on top of a casket, and it is thus an object of the invention to provide a floral holder for caskets and the like to restrain floral arrangements from movement.

It is a further object of the invention to provide a floral holder for caskets and the like which can be instantly clamped to or unclamped from the lid of the casket.

It is a further object of the invention to provide a floral holder which will restrain floral arrangements of any size from movement.

A still further object of the invention is to provide extensions for the floral holder, which extensions can be instantly and firmly affixed to the floral holder and quickly removed therefrom.

A further object of this invention is to provide a floral holder comprising in combination a flat frame, a plurality of spaced-apart spikes projecting from one side of said frame, and an expansion clamp projecting from said frame on the side opposite said spikes.

The invention will be described in more detail with reference to the accompanying drawings in which:

FIGURE 1 is a top plan view of the floral holder and also illustrates an extension frame;

FIGURE 2 is a side plan view of the floral holder and also shows an extension frame;

FIGURE 3 is a sectional view taken along line 3—3 of FIGURE 1;

FIGURE 4 is an enlarged sectional view taken along line 4—4 of FIGURE 1;

FIGURE 5 is an enlarged sectional view taken along line 5—5 of FIGURE 1; and

FIGURE 6 is a sectional view of a casket showing the floral holder in position thereon.

Referring now in more detail to the drawings a flat frame 1 is provided on one side with a plurality of spikes 2. As seen in FIGURE 2 the underside of frame 1 is provided with a strip of skid resistant material 3, which may be rubber or plastic or any other suitable material. Clamping means indicated generally at 4 in FIGURE 1 are most clearly illustrated in FIGURE 4. A screw 5 is adapted to be manually turned by knob 6. Screw 5 is adapted to threadably engage a nut 8. Plates 9 and 10 which project downward from frame 1 are normally urged together by spring 7. As screw 5 is tightened into nut 8, spring plates 9 and 10 are forced to separate in the direction of the arrows shown in FIGURE 4.

As most clearly illustrated in FIGURES 4 and 5 the clamp is fixedly attached to the underside of frame 1 by bar 12 which passes through spring 10 and is riveted to the frame 1 at 13.

As shown in FIGURES 1 and 2 an extension frame 11, provided with spikes 2 on its upper surface and an insulating material 3 on its lower surface, may be removably attached to main frame 1. One example of a suitable means of attaching extension frame 11 to main frame 1 is illustrated in FIGURE 3 where holes 14 are adapted to receive lugs 15 on extension frame 11.

During use the spring plates 9 and 10 of the main frame 1 are inserted in the transverse opening which exists on all caskets between the hinged portions of the casket lid. As shown in FIGURE 6 a casket 16 includes a space 18 between lid portions 17. Screw 5 is rotated to open plates 9 and 10 in the direction of the arrows of FIGURE 4 thus firmly clamping main frame 1 tightly to the top of the casket lid. A floral arrangement is then pushed on spikes 2 and the floral arrangement will be restrained from movement. If necessary one or more extension frames 11 may also be used, depending on the size of the floral arrangement.

It is frequently necessary to transport caskets through narrow door openings and hallways during funeral services, and the casket must be vertical to pass therethrough. In practice the floral holder will restrain a floral arrangement even when the casket is substantially vertical.

It will be appreciated that the expansion clamping means illustrated in FIGURE 4 is merely illustrative of one form of suitable clamping means, and that many other expansion type clamps may be utilized. In addition, the method of attaching extension frames illustrated in FIGURE 3 is merely illustrative of one form of attaching extension frames illustrated in FIGURE 3 is merely illustrative of one form of attachment, and many other means, well known per se, may be utilized. Moreover, the rectangular frame illustrated in the drawings is, again, merely illustrative of one suitable frame shape, and any other frame shapes such as triangular, circular, or square may be employed.

In addition, rather than employing strips 3 as shown in FIGURE 2, blocks of skid-resistant material may be used at each corner of the frame. The use of corner blocks may be of advantage to allow space for the name plate on the casket top under the frame.

The foregoing disclosure is by way of example only and is not intended to restrict the scope of the invention which is described in the appended claims.

I claim:
1. A floral display holder for removable attachment to the upper surface of a closed casket having two lids with a space between said lids extending transversely of said casket, said holder comprising a skeleton frame, spikes projecting upwardly from said frame for piercing and removably holding a floral display in place on said frame, yieldably means on the lower surface of said frame for engaging and supporting said frame on the upper surface of the casket and means for removably securing said frame to the casket in a manner to prevent damage to the upper surface of the casket, said last named means comprising a clamp mounted on said frame, jaws on said clamp projecting downwardly below said frame for insertion into the space between the lids of the casket and means for spreading said jaws to fric- tionally engage the adjacent ends of the lids of the casket to removably secure said frame thereon.

2. A floral display holder as defined in claim 1 and including an auxiliary frame, one of said frames having vertical apertures therein adjacent one end and the other frame having upstanding lugs adjacent one end, said lugs being removably received in said apertures to removably secure said auxiliary frame to said first mentioned frame to provide a holder for a floral display of greater size.

References Cited by the Examiner

UNITED STATES PATENTS

| | | | |
|---|---|---|---|
| 1,018,326 | 2/1912 | Klein | 27—1 |
| 2,144,140 | 1/1939 | Batcheller. | |
| 2,190,463 | 2/1940 | Watt | 24—243.2 |
| 2,234,512 | 3/1941 | Wilson. | |
| 2,560,975 | 7/1951 | Metzger. | |

FOREIGN PATENTS

| | | |
|---|---|---|
| 1,160,932 | 10/1958 | France. |
| 134,134 | 10/1919 | Great Britain. |
| 485,462 | 5/1938 | Great Britain. |

OTHER REFERENCES

Embalmer's Monthly, Impressive, November 1949, Inside back cover page relied on.

EARL M. BERGERT, *Primary Examiner.*

JACOB STEINBERG, *Examiner.*

W. POWELL, *Assistant Examiner.*